(12) United States Patent
Chambosse

(10) Patent No.: US 10,207,658 B2
(45) Date of Patent: Feb. 19, 2019

(54) SELF-FASTENED BRACKET FOR MOUNTING A WIRE HARNESS TO A SUPPORT STRUCTURE OF A VEHICLE AND VEHICLE COMPRISING THE SAME

(71) Applicant: VOLVO TRUCK CORPORATION, Gothenburg (SE)

(72) Inventor: Cyrill Chambosse, Saint Priest (FR)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/528,672

(22) PCT Filed: Nov. 25, 2014

(86) PCT No.: PCT/EP2014/003136
§ 371 (c)(1),
(2) Date: May 22, 2017

(87) PCT Pub. No.: WO2016/082848
PCT Pub. Date: Jun. 2, 2016

(65) Prior Publication Data
US 2017/0267191 A1    Sep. 21, 2017

(51) Int. Cl.
*B60R 16/02*    (2006.01)
*H02G 3/32*    (2006.01)
*F16B 2/08*    (2006.01)
*F16L 3/10*    (2006.01)
*F16L 3/233*    (2006.01)

(52) U.S. Cl.
CPC .......... *B60R 16/0215* (2013.01); *F16B 2/08* (2013.01); *F16L 3/1058* (2013.01); *F16L 3/233* (2013.01); *H02G 3/32* (2013.01)

(58) Field of Classification Search
CPC ...... B60R 16/0215; F16L 3/058; F16L 3/233; H02G 3/32
See application file for complete search history.

(56) References Cited

U.S. PATENT DOCUMENTS 2,373,833 A * 4/1945 Johnson ................ F16L 3/1233
248/74.3
3,087,700 A * 4/1963 Carpenter ............. F16L 3/1058
248/74.3
(Continued)

FOREIGN PATENT DOCUMENTS

CA    2184456 A1    11/2013
JP    63104780    8/1988
(Continued)

OTHER PUBLICATIONS

International Search Report (dated Aug. 3, 2015) for corresponding International App. PCT/EP2014/003136.
(Continued)

*Primary Examiner* — Anita M King
(74) *Attorney, Agent, or Firm* — WRB-IP LLP

(57) ABSTRACT

A fixation arrangement adapted for mounting a wire harness on a support structure of a vehicle includes a rigid portion adapted for clamping the wire harness, and a flexible arm adapted for clamping the fixation arrangement on the support structure so as to squeeze the support structure between the flexible arm and the rigid portion.

12 Claims, 4 Drawing Sheets

(56) References Cited

U.S. PATENT DOCUMENTS

| | | | |
|---|---|---|---|
| 3,113,754 A | 12/1963 | Jansson | |
| 5,354,021 A * | 10/1994 | Farrell | F16L 3/233 |
| | | | 24/16 PB |
| 5,639,049 A * | 6/1997 | Jennings | F16L 3/123 |
| | | | 24/563 |
| 5,730,399 A | 3/1998 | Baginski | |
| 7,134,633 B2 | 11/2006 | Logan | |
| 7,407,138 B1 * | 8/2008 | Gretz | F16L 3/02 |
| | | | 248/304 |
| 8,616,512 B2 * | 12/2013 | McMath | F16L 3/1218 |
| | | | 248/304 |
| 8,991,774 B2 * | 3/2015 | Hajduch | B65D 63/00 |
| | | | 248/220.22 |
| 9,718,591 B2 * | 8/2017 | Lu | B65D 63/1027 |
| 2007/0278358 A1 * | 12/2007 | Clark | B60R 16/0215 |
| | | | 248/74.1 |
| 2014/0131528 A1 * | 5/2014 | Blakeley | H02G 3/32 |
| | | | 248/74.2 |
| 2017/0110864 A1 * | 4/2017 | Akahane | H02G 3/32 |
| 2017/0122459 A1 * | 5/2017 | Haynes | F16L 3/1058 |

FOREIGN PATENT DOCUMENTS

| | | |
|---|---|---|
| JP | 2000023335 | 1/2000 |
| JP | 200014763 | 6/2000 |
| JP | 2011250522 | 12/2011 |
| JP | 2012253909 | 12/2012 |
| WO | 2006030725 A1 | 3/2006 |
| WO | 2009082325 A1 | 7/2009 |
| WO | 2012056747 A1 | 6/2012 |

OTHER PUBLICATIONS

Japanese Official Action (dated Jun. 26, 2018) for corresponding Japanese App. 2017-528152.

Chinese Official Action (dated Oct. 31, 2018) for corresponding Chinese App. 201480083671.7.

* cited by examiner

SELF-FASTENED BRACKET FOR MOUNTING A WIRE HARNESS TO A SUPPORT STRUCTURE OF A VEHICLE AND VEHICLE COMPRISING THE SAME

BACKGROUND AND SUMMARY

The invention relates to a self-fastened bracket for mounting a wire harness to a support structure of a vehicle, to a method of mounting such a wire harness using said self-fastened bracket, to the use of fixation means such as the self-fastened bracket, and to a vehicle comprising such a self-fastened bracket.

The invention is directed to the automotive vehicle, and in particular to medium duty or heavy-duty vehicles, such as trucks, buses and construction equipment. Although the invention will be described with respect to a truck, the invention is not restricted to this particular vehicle, but may also be used in other vehicles, such as cars. The present invention is directed to any type of vehicle, including hybrid vehicles, electrical vehicles, and vehicle motorized with a consumption engine.

More particularly, the invention finds its application in vehicle electrical wiring systems. Known vehicle electrical wiring systems are typically configured to provide electrical power and/or control signals to various electrical components throughout the vehicle. For example, a wire harness may deliver electrical power and/or control signals for driving motors, heaters and lights, internal and external communication means. To limit movements of wire harnesses during vehicle operation, cable ties and brackets are employed to secure the wire harnesses on support structures of the vehicle, such as the chassis.

Typically, CA-A-2 814 456 discloses a bracket comprising a tie portion that is configured to allow a tie to wrap around a wire harness in order to secure it to the bracket and a mounting portion that is configured to secure the bracket to the support structure of the vehicle. In the example, the tie portion of the bracket is exclusively dedicated to the tightening of the wire harness thanks to a strap. This tie portion is totally independent from the mounting portion. The mounting portion is secured to the support structure by another fixation means, like a screw. In the above-mentioned document, a screw is inserted into an opening of the mounting portion and engaged in a threaded opening of the support structure.

When using this kind of bracket, two distinct operations are required to secure a wire harness to the support structure of the vehicle. A first operation comprises clamping the tie portion to keep the wires of the wire harness together and a second operation comprises driving the screw in rotation to fix the mounting portion on the support structure. Moreover, this may require tapping the mounting portion and/or the support structure beforehand.

Considering the number of cable to fix in a vehicle, mounting all of them to support structures of the vehicle is very time-consuming.

It is desirable to provide a supporting component, or a fixation means, which allows mounting a satire harness to the support structure of a vehicle in a fast process. Preferably, the mounting is performed in one step.

To this end, an aspect of the invention concerns a self-fastening bracket for mounting a wire harness on a support structure of a vehicle, said self-fastening bracket comprising:

a rigid portion adapted for clamping the wire harness, and
a more flexible portion, or flexible arm, adapted for clamping said self-fastened bracket on the support structure. The flexible arm is linked to the rigid portion at one end, in such a way that its second end moves towards the rigid portion when tightening the wire harness so as to squeeze the support structure between the flexible arm and the rigid portion.

The self-fastened bracket of the present invention is adapted to receive a cable tie that secures the wire harness on the rigid portion, while allowing to clamp the flexible arm on the support structure when tightening the wire harness. Indeed, when tightening the wire harness, the flexible arm moves towards the rigid portion and catches the support structure in a vise-like grip between the flexible arm and the rigid portion.

According to further aspects of the invention, the fixation means may incorporate one or several of the following features:

- The flexible portion, or flexible arm, is a flexible tab and moves by elastic deformation.
- The flexible arm includes a passage opening adapted for the passage of a tie.
- The rigid portion has a L-shape.
- The flexible arm is linked at one end to the rigid portion at a first branch of the L-shaped rigid portion, and its second end is adapted to move towards the second branch of the L-shaped rigid portion when tightening the cable tie.
- The first branch of the L-shaped rigid portion is provided with at least one passage opening adapted to the passage of a tie. Said passage opening is provided below the attach point of the flexible arm on said first branch of the L-shaped rigid portion.
- The flexible arm is linked to the first branch of the L-shaped rigid portion through a deformable element that allows the articulation of the flexible arm with respect to the rigid portion.
- The deformable element that links the flexible portion to the rigid portion is a thin tab, the thickness of which is decreased with regard to the thickness of the flexible portion.
- the deformable element is integral with the flexible arm and the rigid portion.
- The flexible arm is curved.
- The cable tie that secures the wire harness may be a plastic strap.
- The flexible arm is integral with the rigid portion.

The invention also concerns a vehicle, equipped with the self-fastened brackets herein described.

It is also desirable to provide a means for mounting the wire harnesses that avoids corrosion. Threaded openings on the metallic support of a vehicle may provide some areas that are more sensitive to the corrosion. Also, the use of screw or any kind of metallic brackets to clamp on the support of a vehicle may damage the paint, and hence, induce or favorise the corrosion. The self-fastened bracket of the present invention allows the mounting of the cable avoiding the risk of corrosion.

It is also desirable to provide a means of mounting cables that is light and cheap. Due to the increasing number of cables and tubes in a modern vehicle, numerous fixations means are necessary. When they are metallic, these fixations means represent a weight which may be detrimental to the fuel consumption. The self-fastened bracket presently disclosed has the advantage to be light and therefore allows saving some weight.

Although the self-fastened bracket of the present invention may be used for electrical cables, it is also usable for the mounting of any type of tubes or pipes, or related equipment, that may be rigid or flexible. It is therefore also desirable to limit the diversity of the fixation means used in a vehicle, using a polyvalent fixation means like the present self-fastened bracket.

The present invention, according to an aspect thereof, also provides an efficient method for rapidly mounting wire harnesses, tubes, or pipes, or related equipment on a vehicle. In particular, the method allows such a mounting wherein the wire harnesses, tubes or pipes are directly clamped on the support of the vehicle, without additional step of screwing or fixing our the support. In a specific embodiment, the method of the present invention allows securing the wires, wire harnesses, tubes, pipes or related equipment on the fixation means and fixing the fixation means on the support of the vehicle in one step. Accordingly, the step that allows securing the wires, wire harnesses, tubes, pipes and related equipment on the fixation means while fixing the fixation means on the support is the tightening of the wire with a tie. More particularly, the method of the present invention comprises the steps of:

a) positioning the fixation means on a support, b) Positioning the wires, wire harnesses, tubes, pipes or related equipment onto the fixation means used in step a), c) Tightening a tie around the wires, wire harnesses, pipes, tubes or related equipment, wherein the tie passes through dedicated passages provided on the fixation means.

Steps a) and b) above-described may be reversed, meaning that step b) can occur before step a).

BRIEF DESCRIPTION OF THE DRAWINGS

The invention will now be explained in correspondence with the annexed figures, representing an illustrative example, without restricting the the invention. In the annexed figures.

DETAILED DESCRIPTION

Figure 1:
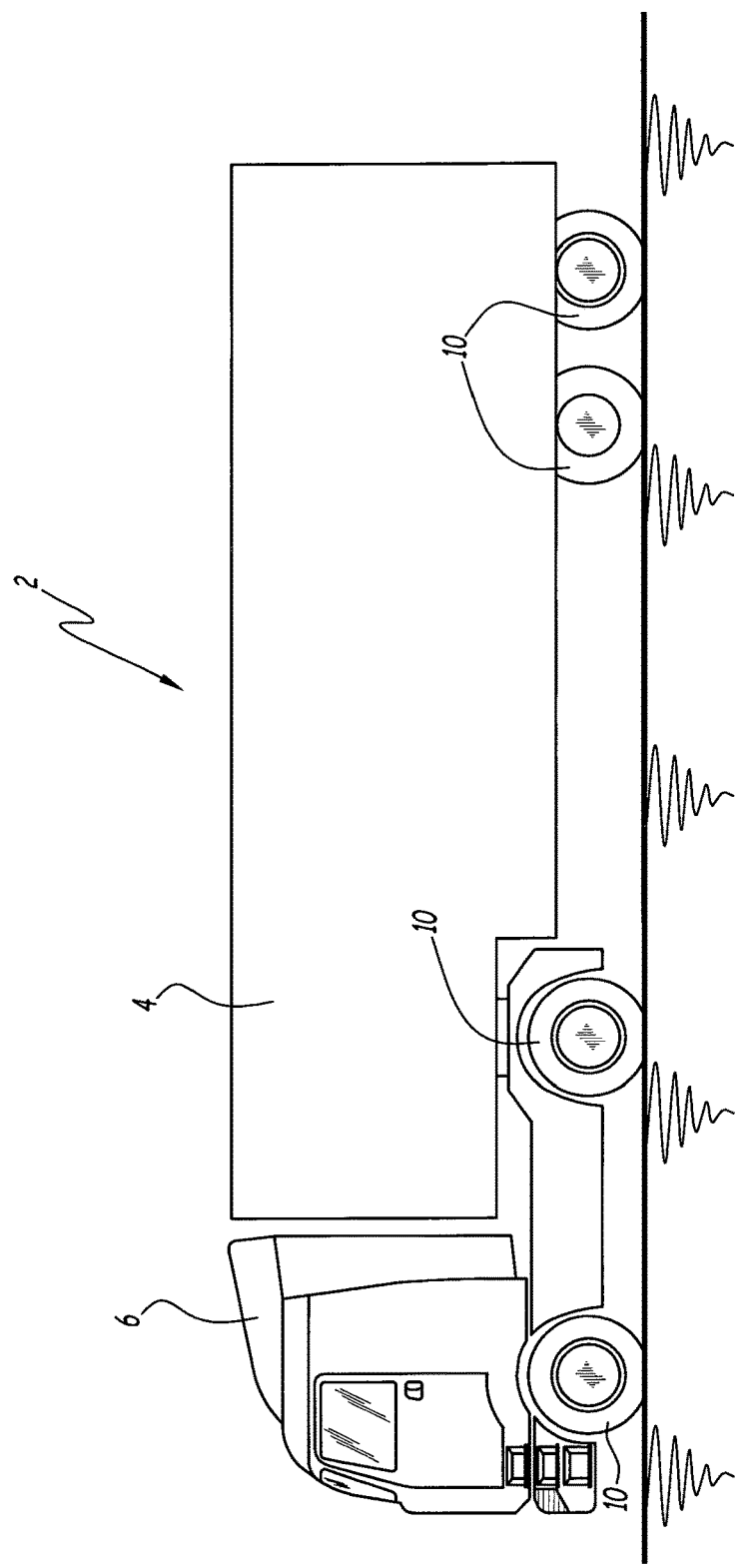
FIG. 1 is a side view of a truck comprising at least one, non-represented fixation means according to the invention.

The truck 2 comprises a traction unit, or lorry 6. The lorry 6 tows a trailer 4 and may comprise one, two or more pairs of wheels 10. The trailer 4 may also include two pairs or more of rear wheels 10. The truck 2 includes a support structure 60 on which is mounted at least one fixation means. Said fixation means may be the self-fastened bracket. The self-fastened bracket 1 and the support structure 60 are visible on FIG. 2. The support structure 60 of the vehicle 2 may be the chassis. The support structure 60 may be any vertical structure or horizontal structure, related either to the traction unit or to the trailer.

The self-fastened bracket 1 is adapted for mounting a wire harness H onto the support structure 60 of the truck 2. The wire harness H includes several wires W, that may be electrical cables, for transmitting electrical power or signals. Alternatively, the self-fastened bracket 1 is also adapted for mounting tubes or pipes, which may be used for supplying fluids, like air, compressed air, oil, fuel, or other fluids. The fluids supplied through such pipes or tubes may be cold or warm.

Figure 5:
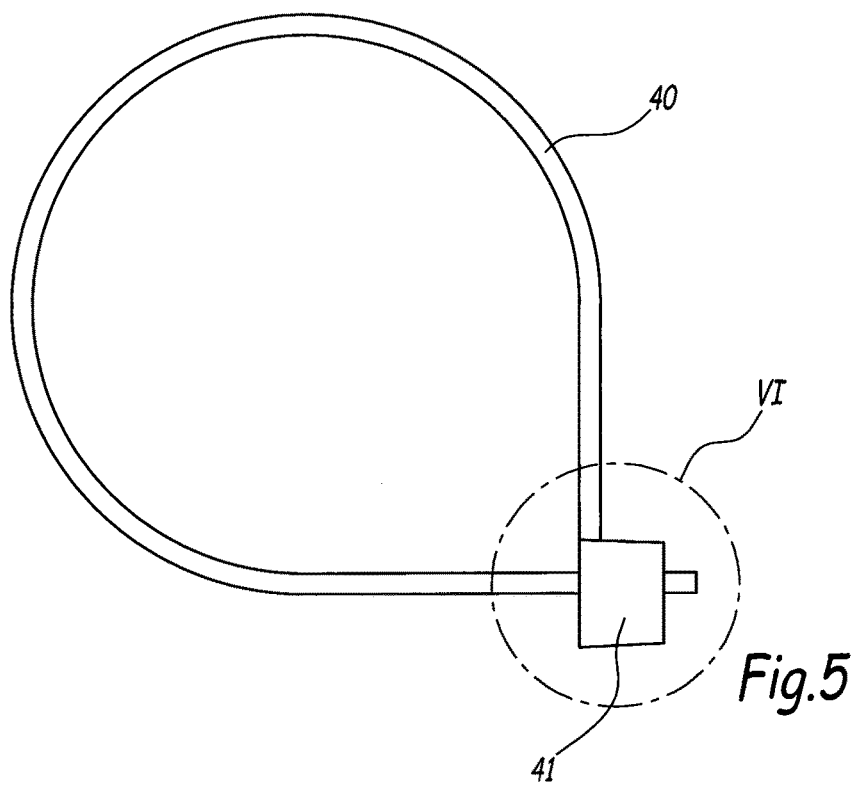
FIG. 5 is a side-view of a tie that may be used with the fixation means, as represented in FIG. 2.
Figure 6:
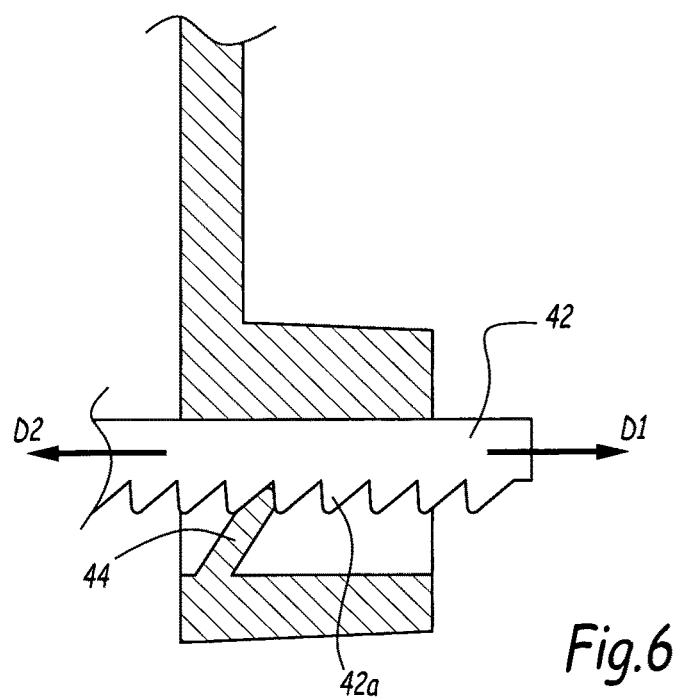
FIG. 6 is a detailed view of the circle VI of FIG. 5.

As shown on FIGS. 2 and 4 to 6, the self-fastened bracket 1 allows a tie 40 to wrap around the wire harness H so as to clamp, or group, the wires W of harness H together. The tie 40 enables to secure the wire harness H to the self-fastened bracket 1, while pushing the flexible arm 26 toward the support structure 60, as indicated by the arrow E1 in FIG. 4, thus clamping the self-fastened bracket 1 onto the support structure 60. In the example of the figures, the tie 40 is a plastic strap, but any equivalent means for tightening may be used, such as a tensile or a stretching device or element. Several systems already exist that are adapted for tightening wires. FIGS. 5 and 6 provide an illustrative example where the tie 40 includes means to prevent the strap 40 from loosening due to vibration in normal use of the vehicle. The extremities 41 and 42 of the strap 40 cooperate one with the other to close the strap 40. The extremity 41 of the strap 40 determines a box for receiving the other extremity 42. The box 41 is hollow and delimits a passageway for the other extremity 42. The extremity 42 is provided with a series of teeth 42a that are adapted to cooperate with a locking tab 44 of the box 41. The locking tab 44 is elastically deformable and is engaged between two adjacent teeth 42a. It does not oppose to the strap tightening as it can bend to let the extremity 42 of the strap 40 move along a direction of the passageway. However, the tab 44 is oriented so as to oppose to the displacement of the strap 40 in the opposite direction D2, that is to the strap loosening.

Figure 3:
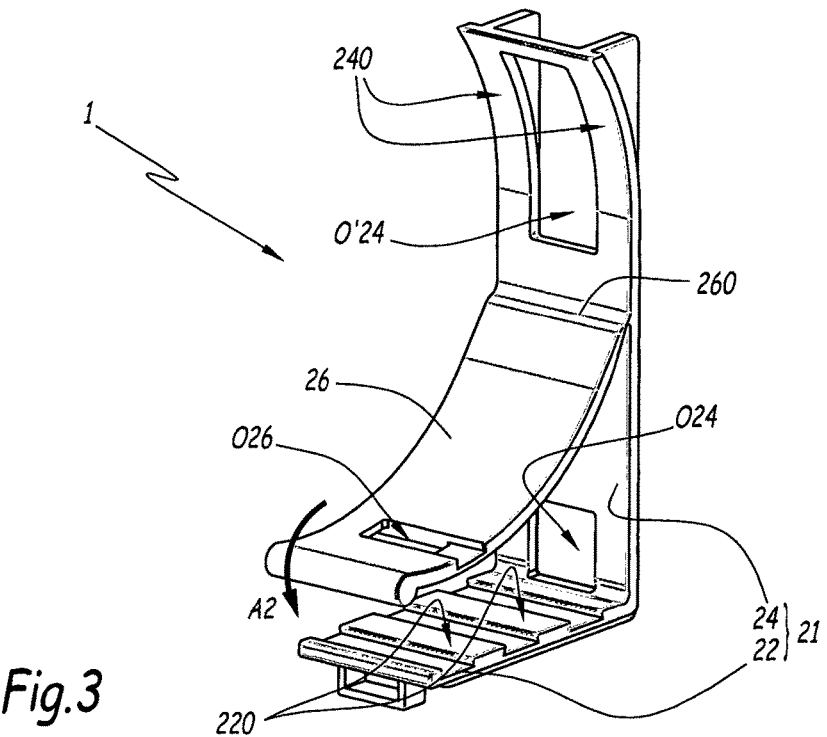
FIG. 3 is a perspective view of the fixation means of the present invention, represented in a released position, and without cable tie.
Figure 4:
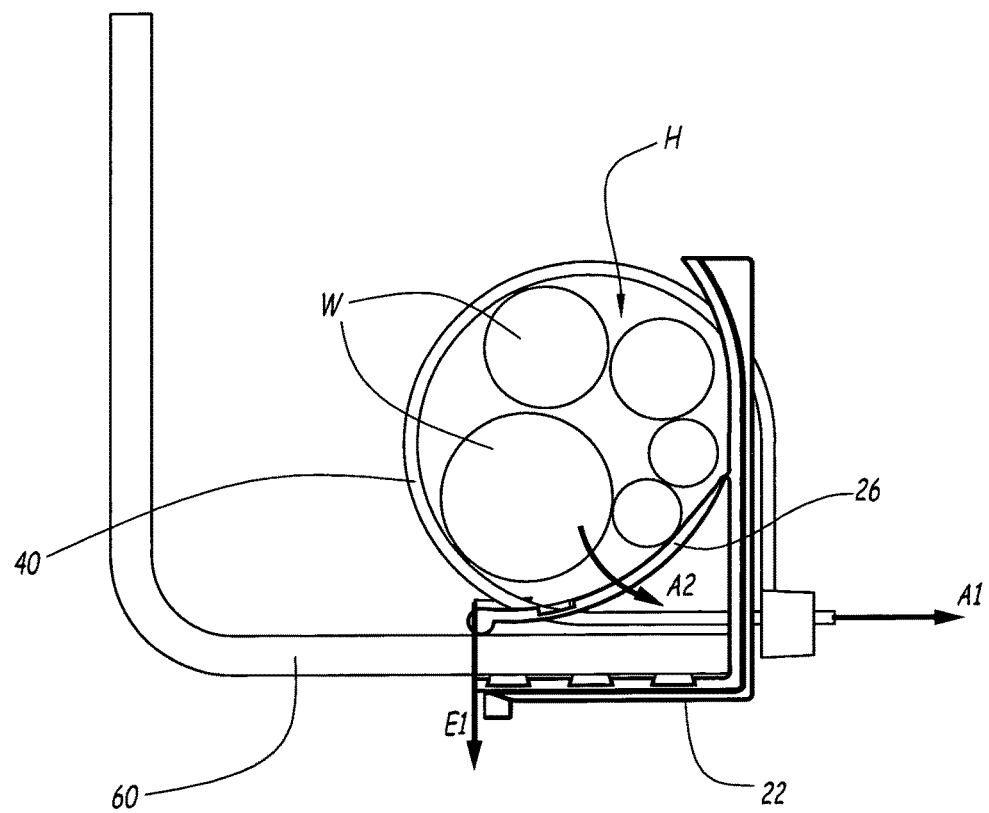
FIG. 4 is a view of the section of the fixation means with the wire and cable tie, along the arrow of FIG. 2.

As shown on FIG. 3, the self-fastened bracket 1 comprises a L-shaped rigid portion 21 and a flexible arm 26, linked to the first branch 24 of the L-shaped rigid portion 21 and which cooperates with the second branch 22 of the L-shaped rigid portion 21 for clamping on the support structure 60 of the vehicle. It allows securing the self-fastened bracket 1 to the support structure 60 of the vehicle. The self-fastened bracket 1 may be made of a synthetic material, e.g. plastic, thermoplastic, polymer or resin, that can be either molded or thermoformed. As an example, polyacrylamide may be used, in particular polyacrylamide PA66. The self-fastened bracket 1 may also comprise metallic elements or metallic alloys or other material that have the suitable flexibility/rigidity for the purpose of the present invention. The self-fastened bracket 1 may also be fully made with such a material.

The flexible arm 26 and the L-shaped rigid portion 21 are preferably made in one-piece. The flexible arm 26 and the rigid portion 21 are preferably made in the same material. The higher flexibility of the arm 26, compared to the rigid portion 21, may be obtained by decreasing the thickness of the arm 26 with respect to the rigid portion 21. Typically, when the self-fastened bracket 1 is made in polyacrylamide, such as PA66, the thickness of the arm 26 is advantageously comprised between about 1 mm and about 3 mm, and preferably between 1.7 mm and 2.2 mm. The thickness of the rigid portion may be comprised between about 2 mm and about 4 mm, preferably between about 3 mm and about 3.5 mm. Depending of the specific requirements, the ratio between the thickness of the arm 26 and the rigid portion 21 may vary. In a specific embodiment, the thickness of the flexible arm 26 is between 10% and 30% less than the thickness of the rigid portion 21. In other words, the thickness, of the flexible arm 26 represents 70 to 90% of the thickness of the rigid portion 21. In another specific embodiment, the thickness of the flexible arm 26 represents between 60% and 70% of the thickness of the rigid portion 21. A more flexible arm 26 can be obtained wherein the thickness represents between around 30% and around 50% of the thickness of the rigid portion.

It is to be noted that in case the self-fastened bracket is made with another material than polyacrylamide, the thicknesses may be adapted to be in relation with the natural rigidity of the material.

Above and below, the flexibility of the arm 26 and the rigid portion 21 refers to their capacity to elastically change their shape under a given force. A flexible arm 26 means that the arm 26 is allowed to easily modify its shape under an applied force. Such applied force may be the tightening of the wires or wire harnesses with the tie. On the contrary, the rigid portion 21 is meant for a portion the shape of which does not significantly change under a constraint, like the tightening of the wire harnesses with a cable tie. The self-fastened bracket 1 is therefore designed in such a way that the flexible arm 26 is elastically deformed by tightening the cable tie 40, whereas the rigid portion 21, including the first branch 24 and the second branch 22, remains substantially straight and non-deformed.

The articulation 260, linking the flexible arm 26 to the rigid portion 21 is more flexible than the arm 26, thus providing a hinge that allows the flexible arm 26 to rotate with respect to the rigid portion 21. In a specific embodiment of the present invention, the hinge or articulation 260 has a thickness comprised between about 0.3 mm and 1 mm, preferably between about 0.4 mm and 0.5 mm. In another embodiment, the thickness of the hinge or articulation 260 represents 10% of the thickness of the arm 26. In another embodiment, the thickness of the hinge or articulation 260 represents between 10% and 25% of the thickness of the arm 26. In yet another embodiment, the thickness of the hinge or articulation 260 represents between 30% and 50% of the thickness of the arm 26.

Figure 2:
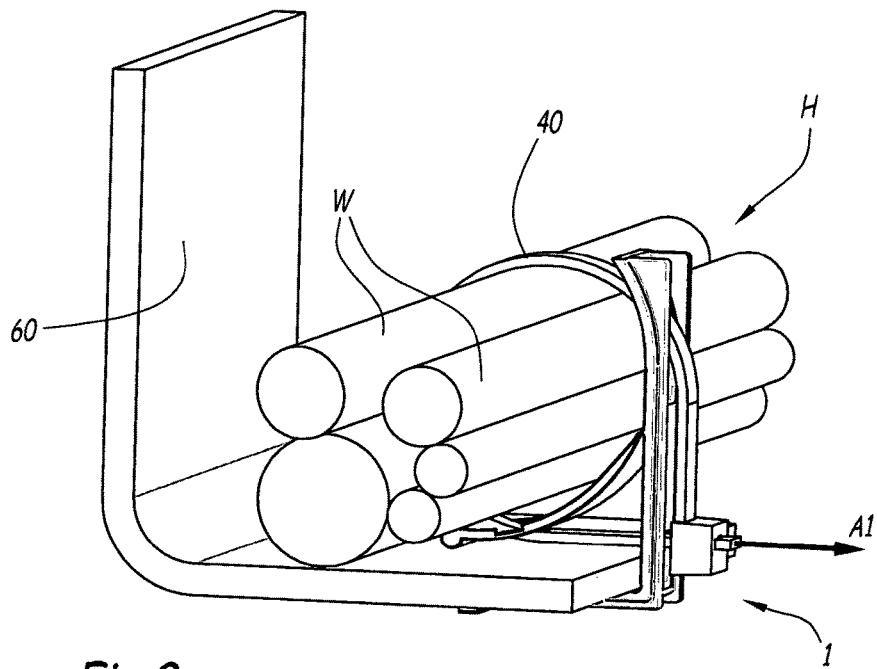
FIG. 2 is a perspective view of a fixation means according to the invention, represented in a mounted position on a support structure of the vehicle of figure, with the cable tie and the wire harness.

Here-below, the directions "up" and "down" have to be considered relative to the configurations of FIGS. 2 and 3. It is to be understood that this example is not limitative and that the self-fastened bracket 1 may be, for instance, mounted upside down. The self-fastened bracket 1 may also be mounted on a vertical structure.

The L-shaped rigid portion 21 includes a first branch 24 that extends perpendicularly to the second branch 22 and that delimits two passage openings 024 and 0'24 for passing the tie 40. Opening 024 is provided at the end of the branch 24 that is close to the branch 22. The opening 0'24 is provided close to the opposite end of the first branch 24. Openings 024 and 0'24 are disposed on either side of an extremity of the flexible arm 26 by which it is connected to the L-shaped rigid portion 21. In the configuration of FIGS. 2 and 3, the first branch 24 extends vertically while the second branch 22 extends horizontally.

The second branch 22 of the L-shaped rigid portion 21 is adapted to contact the bottom portion of the support structure 60. The upper face of the second branch 22 faces the support structure 60 when the self-fastened bracket 1 is mounted onto the support structure 60. Said upper face may be provided with grip platelets 220 for increasing grip with the bottom surface of the support structure 60. Said upper face may further be provided with a layer of material that increases the grip of the self-fastened bracket. Such material may be rubber, elastomer or equivalent material. It can be fixed on the second branch 22 with glue or other equivalent means, or sleeved onto the branch 22, prior the mounting phase on the support 60. Alternatively, said layer of material may be inserted between the second branch 22 of the L-shaped rigid portion 21 and the support structure 60 during the mounting process. In that specific case, no additional step of fixing the layer on the self-fastened bracket is necessary. Although FIG. 3 shows that the first branch 24 is longer than the second branch 22, others configurations are also possible depending on the specificities of the application. For instance, the length of the second branch 22 may be increased for a better grip on the vehicle structure 60. On the other hand, the length of the first branch 24 has to be adapted to the size of the wire harness.

The first branch 24 may have an end portion 240 that is curved, or comprise a curve, oriented towards the second branch 22. This allows matching with the circular shape of the wire harness and improving the contact with the wire harness H so as to reinforce the wire harness clamping.

The flexible arm 26 may be a flexible tab the extremity of which is attached to the first branch 24 through the articulation 260. More precisely, the flexible arm 26 is attached to a medium portion of the first branch 24, between the openings 024 and 0'24. The flexible arm 26 comprises a passage opening 026, preferably located near its end that is not linked to the L-shaped rigid portion 21 and which allows the passage of the tie 40. The flexible arm 26 is curved. The curvature of the flexible arm 26 is in the continuity of, and has the same orientation than, the curvature of the extremity 240 of the first branch 24 of the L-shaped rigid portion 21. As for the branch 24, the curvature of the flexible arm 26 allows matching with the circular shape of the wire harness H.

The flexible arm 26 is movable by elastic deformation of the attachment point 260, when tightening the wire with the tie 40. This allows squeezing the support structure 60 between the flexible arm 26 and the second branch 22 of the L-shaped rigid portion 21. More precisely, before tightening the wire with the tie 40, the down side of the flexible portion 26 is in contact or in close proximity with the upper side of the support 60. When tightening the wire with the tie 40, the flexible arm 26 comes, in a first step, in contact to the support 60 thanks to the articulation 260, if it is not already in contact, as represented by the arrow A2 on FIGS. 3 and 4. In a second step, when tightening stronger the wire with the tie 40, the flexible arm 26 is elastically deformed, in such a way that the surface of contact with the support 60 increases, while the strength applied on either side of the support 60 by the second branch 22 of the shaped rigid portion and the flexible arm 26 increases. Consequently, thanks to the transmission of the traction effort to the arm 26, the arm 26 exerts an effort E1 on the support structure 60 and the latter is caught up into a vise-like grip formed by the arm 26 and the branch 22 of the bracket 21. This corresponds to a mounting position, wherein the wire harness H is secured to the support structure 60 within the vehicle 2. When the tie 40 is tightened at its maximum, the self-fastened bracket 1 and the wire harnesses are solidly fixed onto the support structure 60. The first and second step above-described are performed in a continuous way, when tightening the tie 40, thus forming together the unique step of tightening the tie around the wire.

In one specific embodiment, the self-fastened bracket, as such mounted, is able to resist against a pullout force up to around 30 kg. Preferably, the self-fastened bracket 1 mounted with the wire harnesses resists against a pullout force up to around 20 kg, more preferably up to around 10 kg. The pullout force means any force of traction that induces the sliding of the self-fastened bracket 1 out of the support structure 60.

The tie 40 that allows securing the wire harnesses onto the first branch 24 of the rigid portion 21 while clamping the flexible arm 26 onto the structure 60, passes through at least the passages 026 and 024, and embraces the wire harnesses H to be secured, by forming a loop. The tie 40 may be further guided through an aperture or a passage 0'24, provided at the extremity of the first branch 24 of the rigid portion 21.

The present invention also provides a method of mounting wires, wire harnesses, tubes, pipes and related equipment onto a vehicle, using fixation means that are cheap, light and rapidly mounted. In particular, the present method aims at limiting the number of steps when mounting the wires on a vehicle, as well as the duration of said steps. As an example, the present method allows to mount cable, wires, wire harnesses, tubes, or pipes on a vehicle structure avoiding the step of screwing the fixation means on the structure. It is also an aim of the present invention to fix the wire without using tools, meaning that the fixation of the wire is performed by hands.

To this end, the method of the present invention comprises the steps of a) positioning a fixation means on the support of the vehicle, that comprises at least two dedicated openings adapted for the passage of a tie, b) Positioning the wires, wire harnesses, tubes, pipes or related equipment onto the fixation means used in step a), c) Tightening a tie around the wires, wire harnesses, pipes, tubes or related equipment, wherein the tie passes through the dedicated passages provided on the fixation means and forms a loop around the wires, wire harnesses, tubes or pipe.

The method of the present invention may further include a step of inserting a grip-improver between the fixation means and the support prior to step a) or concomitant with step a).

Steps a) and b) above described may be reversed or concomitant, meaning that step b) may be performed prior to step a), or at the same time.

In steps a) to c) the fixation means is preferably a device that comprises a flexible arm 26 linked to a rigid portion 21, having a L-shape with a first branch 24 and a second branch 22. Said device may be made in a polymerized material, such as a homo polymer or hetero polymer, a molded polymer, a plastic or thermoplastic material. The fixation means is preferably made in one piece and is designed or adapted to receive a tie.

The fixation means used in steps a) to c) comprises a hinge between the flexible arm 26 and the rigid portion 21, in such a way that the flexible arm 26 is articulated with regard to the first branch 24 of the L-shaped rigid portion 21.

The tightening of the tie 40 in step c) allows grouping the wires, wire harnesses, tubes, pipes or related equipment onto the fixation mean, while securing the fixation means on the support 60, in one and unique step.

The tightening of the tie in step c) may be performed manually, and may be improved with the help of a tool adapted to tight a tie, such as a dedicated squeezing device. The step c) may be optionally followed by the cutting of the extra part of the tie that extends out of the circle VI (see FIG. 6). The tie used may be a strip, preferably made in plastic.

In steps a) to c) the support of the vehicle may be the chassis, or any other horizontal or vertical rail, or skeleton, or girder that is used to design and/or structure the vehicle.

In a preferred embodiment, the fixation means of steps a) to c) is the self-fastened bracket 1, described herein.

It is also desirable to use a novel fixation means adapted for the mounting of wires, wire harnesses, tubes, pipes or related equipment on a vehicle, wherein the fixation means allows to secure said wires, wire harnesses, tubes, pipes or related equipment and to fix the fixation means onto a support at the same time. In particular, the present invention provides the use of a fixation means that can be manually clamped on a support for mounting wires, wire harnesses, tubes, pipes or related equipment, wherein the fixation means allows the passage of a cable tie. In a preferred embodiment, the present invention provides the use of a fixation means, wherein the fixation means is the self-fastened bracket 1 hereby described.

It is to be understood that the present invention is not limited to the embodiments described above and illustrated in the drawings. Rather, the skilled person will recognize that many changes and modifications may be made within the scope of the appended claims.

Besides, the technical features of the different embodiments and alternative embodiments of the invention described here-above can be combined together to generate new embodiments of the invention.

The invention claimed is:

1. A fixation means for mounting a wire harness on a support structure of a vehicle, the fixation means comprising:
   rigid portion adapted for clamping the wire harness, and
   a flexible arm adapted for clamping the fixation means on the support structure,
   wherein the flexible arm is linked to the rigid portion through a hinge, which allows the rotation of the flexible arm with respect to the rigid portion, and wherein the rigid portion is provided with at least one opening, and wherein the flexible arm is provided with at least one opening, adapted to allow the passage of a tie.

2. A fixation means according to claim 1, wherein the rigid portion comprises a first branch orthogonal to a second branch.

3. A fixation means according to claim 1, wherein the flexible arm is linked to the first branch of the rigid portion.

4. A fixation means according to claim 1, further comprising a means of tightening the wire harness while clamping the fixation means on the support structure.

5. A fixation means according to claim 4, wherein the means of tightening the wire harness is a cable tie.

6. A vehicle comprising the fixation means according to claim 1.

7. A method of mounting wires, wire harnesses, tubes, pipes and related equipment on a support of a vehicle, the method comprising:

a) positioning a fixation means on the support of the vehicle, that comprises dedicated openings adapted for the passage of a tie, b) positioning the wires, wire harnesses, tubes, pipes or related equipment onto the fixation means used in the fixation means positioning step, c) tightening a tie around the wires, wire harnesses, pipes, tubes or related equipment, wherein the tie passes through the dedicated openings provided on the fixation means and forms a loop around the wires, wire harnesses, tubes or pipes, wherein the fixation means comprises a flexible arm linked to a rigid portion having a first branch orthogonal to a second branch, wherein the flexible arm of the fixation means is linked to the rigid portion through a hinge.

8. A method according to claim 7, wherein the fixation means is made in a polymerized material.

9. A method according to claim 7, wherein the fixation means is made in one piece.

10. Use of a fixation means for mounting wires, wire harnesses, tubes, pipes or related equipment on a support structure of a vehicle, wherein the fixation means comprises a flexible arm, provided with an opening, a rigid portion provided with at least one opening, and wherein the at least one opening of the rigid portion and the at least one opening of the flexible arm are adapted to allow the passage of a tie, wherein the fixation means is secured on the support structure by a securing operation by which the wires, wire harnesses, rubes, pipes or related equipment are also simultaneously secured to the fixation means.

11. The use of a fixation means according to claim 10, wherein the fixation means is manually clamped on the support structure.

12. The use of a fixation means according to claim 10, wherein the fixation means is a self-fastened bracket, and wherein the fastened bracket is clamped on the support structure at the same time it secures the wires, wire harnesses, tubes, pipes or related equipment thanks to the tightening of the tie.

* * * * *